US008380249B2

(12) United States Patent
Suvanen

(10) Patent No.: US 8,380,249 B2
(45) Date of Patent: Feb. 19, 2013

(54) TRANSMISSION METHOD IN A MOBILE COMMUNICATION SYSTEM

(75) Inventor: Jyri Suvanen, Espoo (FI)

(73) Assignee: Nokia Networks Oy, Espoo (FI)

( * ) Notice: Subject to any disclaimer, the term of this patent is extended or adjusted under 35 U.S.C. 154(b) by 1549 days.

(21) Appl. No.: 09/947,842

(22) Filed: Sep. 6, 2001

(65) Prior Publication Data

US 2002/0049052 A1 Apr. 25, 2002

Related U.S. Application Data

(63) Continuation of application No. PCT/EP99/01615, filed on Mar. 8, 1999.

(51) Int. Cl.
*H04B 1/38* (2006.01)
*H04M 1/00* (2006.01)

(52) U.S. Cl. ... 455/560; 455/73; 455/550.1; 375/E7.198

(58) Field of Classification Search .................... 455/73, 455/550.1, 560; 375/E7.198
See application file for complete search history.

(56) References Cited

U.S. PATENT DOCUMENTS

| | | | | |
|---|---|---|---|---|
| 5,999,813 | A * | 12/1999 | Lu et al. ...................... | 455/435.2 |
| 6,067,289 | A * | 5/2000 | Mueller et al. ................. | 370/310 |
| 6,304,574 | B1 * | 10/2001 | Schoo et al. .................. | 370/401 |
| 6,418,139 | B1 * | 7/2002 | Akhtar ........................... | 370/356 |
| 6,574,221 | B1 * | 6/2003 | Petersen ..................... | 370/395.1 |
| 6,724,813 | B1 * | 4/2004 | Jamal et al. .................... | 375/219 |
| 7,218,952 | B1 * | 5/2007 | Alperovich et al. ........ | 455/552.1 |
| 2003/0012154 | A1 * | 1/2003 | Musikka ....................... | 370/328 |
| 2003/0039237 | A1 * | 2/2003 | Forslow ........................ | 370/352 |

FOREIGN PATENT DOCUMENTS

| | | |
|---|---|---|
| WO | WO 95/24789 | 9/1995 |
| WO | WO 98/28934 | 7/1998 |
| WO | WO 99/05830 | * 2/1999 |
| WO | WO99/05830 | * 2/1999 |

OTHER PUBLICATIONS

Wang et al.; "Wireless Voice-over-IP and Implications for Third-Generation Network Design", Bell Labs Technical Journal, Bell Laboratories, vol. 3, No. 3, Jul. 1998, pp. 79-97.
Berruto, E.; "Research Activities on UMTS Radio Interface, Network Architectures, and Planning", IEEE Communications Magazine, IEEE Service Center, Piscataway, NJ, vol. 36, No. 2, Feb. 1998, pp. 82-95.

(Continued)

*Primary Examiner* — Patrick Edouard
*Assistant Examiner* — Matthew W Genack
(74) *Attorney, Agent, or Firm* — Mintz, Levin, Cohn, Ferris, Glovsky & Popeo, P.C.

(57) ABSTRACT

The present invention proposes a transmission method for transmitting data in a telecommunication network (NW), said telecommunication network comprising at least one access network (RAN) adapted to transmit data to/from at least one terminal device (MS) and a core network (CN, MSC, GW/TC), which are connected to each other via a first interface (Iu), wherein said data are exchanged via said first interface (Iu) using a real-time transfer protocol (RTP). Preferably, said real-time transfer protocol complies with ITU-T H.225 and ITU-T H.323 Recommendations. Consequently, transmission resources available on said first interface can be effectively and economically used, since the RTP protocol conforming to ITU-T H.323 Recommendation is adapted to handle discontinuous transmission. Moreover, interoperability of the radio telecommunication network with an Internet protocol based network can be improved, since the gateway functionality can significantly be reduced due to data being transmitted between the telecommunication network and the Internet protocol based network being in the same data format, so that hardly any transcoding is required. The invention also proposes a corresponding telecommunication network.

21 Claims, 1 Drawing Sheet

OTHER PUBLICATIONS

International Search Report PCT/EP99/01615.

Communication under Rule 71(3) EPC, expected notice of allowance report, issued by the European Patent Office, dated Dec. 23, 2009, 5 pages.

"Digital Cellular Telecommunications System (Phase 2+); In-band Control of Remote Transcoders and Rate Adaptors for Full Rate Traffic Channels", GSM 08.60 version 7.2.1 Release 1998.

Digital Cellular Telecommunictions System (Phase 2+); Inband Tandem Free Operation (TFO) of Speech Codecs; Service Description; Stage 3, GSM 04.53 version 1.6.0.

ITU-T H.225.0, Telecommunication Standardization Sector of ITU, Nov. 2000.

ITU-T H.323 Annex R, Telecommunication Standardization Sector of ITU, Jul. 2001.

* cited by examiner

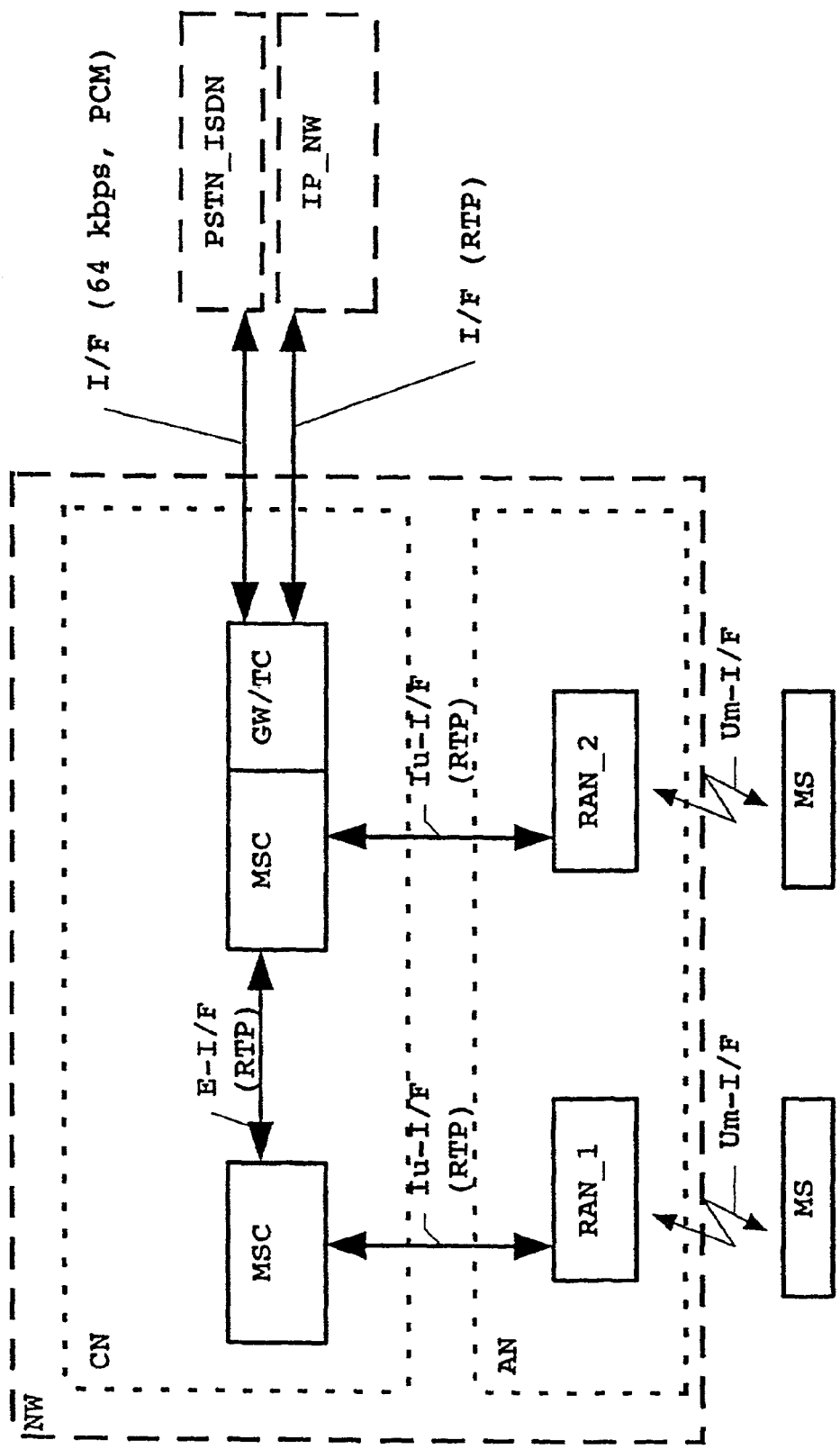

TRANSMISSION METHOD IN A MOBILE COMMUNICATION SYSTEM

This application is a continuation of international application Ser. No. PCT/EP99/01615, filed 8 Mar. 1999.

FIELD OF THE INVENTION

The present invention relates to a transmission method for transmitting data in a telecommunication network and also to a corresponding telecommunication network. Particularly, the present invention relates to such a method to be adopted in mobile telecommunication systems.

BACKGROUND OF THE INVENTION

In currently used mobile radio telecommunication systems such as the existing GSM system, radio resources are limited due to the limited radio spectrum available and/or reserved for such purposes. The saving of radio resources is achieved by the usage of codecs (encoding-decoding devices) which operate at low bit rates. Namely, with such low-bit-rate codecs, the transmission rate on a radio interface is reduced to/expanded from 13 kbps in current GSM systems.

Furthermore, existing mobile radio telecommunication networks like GSM networks have to co-operate with existing public switched telephone networks PSTN such as the currently spreading ISDN network (Integrated Services Digital Network).

However, ISDN-PSTN networks primarily use a representation for speech data of 64 kbps in pulse code modulation (PCM), while the mobile radio telecommunication network uses the above mentioned 13 kbps representation.

Hence, interoperability at an interface I/F between the two types of networks has to be provided for, which is achieved by an interworking function unit also referred to as IWF unit or gateway unit (GW).

In case a call is forwarded from the ISDN-PSTN network to a mobile station MS as a radio terminal device of the radio telecommunication network (and vice versa), a speech coding functionality is required on both sides, i.e. on the network side and on the terminal device side. Namely, speech data of a call forwarded from the ISDN-PSTN network have to be coded in the network side for transmission via the radio interface (air interface Um), and if speech data of "an answer" are transmitted from the terminal device side, the speech data have likewise to be coded for transmission via the air interface.

Such a transmission of coded speech using time divisional multiplexing (TDM) between the radio access part or access network of the telecommunication network (e.g. a base transceiver station) and a speech codec part (e.g. transcoder and/or Transcoding Rate and Adaptation Unit TRAU) associated to, for example, a mobile Services Switching Center MSC as a part of a core network of the telecommunication network, according to GSM, is effected using so-called TRAU frames (for details, reference is made to GSM 08.60).

Now, if a call is established between two terminal devices MS_A and MS_B, speech data transmitted there between are normally transcoded twice. Namely, firstly speech is encoded in the terminal device MS_A and subsequently decoded in the network. Thus, the speech data are present in the 64 kbps PCM format. Thereafter, the speech is encoded again in the network for transmission to the terminal MS_B, where it is decoded upon being received.

Thus, the coding is performed twice, while such double coding adversely affects the quality of transmitted speech, which of course, is undesirable.

In order to prevent such coding being performed twice (also referred to as tandem coding), the European telecommunication Standards Institute (ETSI) has standardized a feature named Tandem Free Operation TFO, which is specified in detail in GSM 04.53. In short, it can be said that this TFO operation is based on an in-band signaling within the speech data stream of 64 kbps.

Herein above and up to now, a description has been made with only the mobile radio telecommunication network and a PSTN network such as the ISDN-PSTN being considered.

However, in most recent times also information networks like the Internet have widely spread and offer a number of increasingly used services. Such networks are based on a so-called Internet Protocol (IP). With such IP based networks, it is currently already possible to transmit speech data (either low bit-rate coded or PCM coded).

Nevertheless, the interoperability of such IP based networks with the currently existing radio telecommunication networks is rather limited and not optimal.

Interoperability between IP based networks and the currently existing (GSM based) radio telecommunication networks has been enhanced by using the above mentioned TFO method also in this respect.

However, although enhanced, this is not an optimum solution, since due to the adopted in-band signaling a connection (i.e. transmission channel) is rather slowly established and a minor speech degradation is still present.

Current developments are directed to so called third generation telecommunication systems, which are also referred to as UMTS (Universal Mobile Telecommunication System) systems.

However, while these UMTS systems are currently under development, there are no definite standards in terms of how the interoperability between those third generation telecommunication networks and IP based networks is to be assured and/or improved in comparison to existing telecommunication networks. Also, currently there are no specifications as regards the speech data transmission within a third generation network, i.e. speech transmission between a radio access network and a corresponding core network, which form together a UMTS network.

SUMMARY OF THE INVENTION

Hence, it is an object of the present invention to provide a method for transmitting data in a telecommunication network, and a corresponding telecommunication network, which assures an improved and simplified interoperability of a telecommunication network with other networks.

According to the present invention, this object is achieved by a transmission method for transmitting data in a telecommunication network, said telecommunication network comprising at least one access network adapted to transmit data to/from at least one terminal device and a core network, which are connected to each other via a first interface, wherein said data are exchanged via said first interface using a real-time transfer protocol.

Preferably, said real-time transfer protocol complies with ITU-T H.225 and ITU-T H.323 Recommendations.

Also, according to the present invention this object is achieved by a telecommunication network, comprising at least one access network adapted to transmit data to/from at least one terminal device via a first interface, and a core network including at least one access network control device having a gateway interworking function unit adapted to provide at least a second interface to at least one other network, wherein said core network further comprises a transcoding function unit adapted to transcode said data transmitted via said first interface to data transmitted via said second interface, said transcoding function unit being combined with said gateway interworking function unit.

Favorable further refinements of the present invention are defined in the dependent claims.

Thus, with the present invention being implemented in a UMTS (third generation) telecommunication network, improved and simplified interoperability of a telecommunication network with other networks such as ISDN-PSTN or IP based networks is assured.

Moreover, since all data transmission (of circuit switched services) within the third generation network is transmitted in coded format using the RTP protocol, no transcoding is required. Also, in case data are transmitted to or from an IP based network, no transcoding is required, since IP based networks already adopt the real time transmission RTP protocol. Only in case data are transmitted to or from the telecommunication network from another network such as the ISDN-PSTN network, transcoding is required. Therefore, the transcoding functional unit can be arranged to be provided only at the gateway unit of the telecommunication network Thus, the gateway function to be implemented in a gateway unit is almost zero, which reduces the costs of the gateway functional unit.

Furthermore, since the RTP protocol conforming to ITU-T H.323 has an inherent capability to handle discontinuous transmission (DTX), transmission resources to be utilized in the Iu interface between core network and access network can be economically used.

BRIEF DESCRIPTION OF THE DRAWINGS

The present invention will be more readily understood with reference to the accompanying drawings, in which FIG. 1 schematically shows a possible architecture for a radio telecommunication network of the third generation with the present invention being implemented.

DETAILED DESCRIPTION OF PREFERRED EMBODIMENTS

The present invention will now be described in detail with reference to the FIG. 1 of the drawing.

Prior to describing the network architecture with the transmission method according to the present invention being implemented, it should be noted that two assumptions are made.

Firstly, it is assumed that a transcoding function or transcoding functional unit TC is located at a side of a core network CN. (This is in a way similar to currently existing systems, in which the above mentioned TRAU is located closely to a mobile services switching center MSC as an access network control device.)

Secondly, the description starts from the assumption that codec devices used for coding/decoding data to be transmitted on a chosen transmission medium are the same, i.e. particularly, an IP based network IP_NW and a third generation radio telecommunication network NW use the same media codecs.

A telecommunication network NW such as for example a radio telecommunication network of the third generation (UMTS network) consists of an access network AN and a core network CN. The access network and the core network are interconnected by a first interface I/F also known as Iu-Interface Iu-I/F.

The access network AN consists of at least one radio access network unit RAN_1, RAN_2, each of which is adapted to communicate with at least one terminal device MS. Such communication is effected via a fourth interface I/F. In case of a radio telecommunication network, this interface is referred to as air interface or Um Interface Um-I/F. A radio access network unit RAN may consist for example of base transceiver devices and/or base transceiver device controller devices.

The core network CN consists of at least one access network control device MSC, also referred to as mobile services switching center. Furthermore, at least one access network control device is adapted to provide a gateway interworking function GW, to thereby provide at least a third interface to at least one other network. In case there are at least two access network control devices MSC, data are exchanged there between via a second interface I/F also referred to as E interface E-I/F.

Via the gateway function, a third interface to at least one other network is established to interoperate with such other networks. FIG. 1 shows as typical examples an interface I/F(64 kbps, PCM) to an ISDN_PSTN network, as well as an interface I/F(RTP) to an Internet Protocol based network also referred to as IP network IP_NW. Although FIG. 1 shows one of such other networks only, it should be noted that more than one network of each type can interoperate with the telecommunication network with the transmission method according to the present invention being implemented. Also, the IP based network IP_NW can be the Internet, but also an Intranet.

Moreover, as shown in FIG. 1, an access network control device MSC adapted to provide said gateway interworking function GW is additionally adapted to perform a transcoding TC between data present in the pulse code modulated data format and the data present in the real-time transfer protocol format.

According to the present invention, a transmission method is implemented in such a network, according to which speech and other circuit switched services such as audio and video services is transmitted in the first interface Iu-I/F between the access network AN (or a radio access network unit RAN) and the core network CN (or an access network control device MSC) using a real time protocol RTP as a framing method in this interface.

Preferably, the RTP protocol complies with ITU-T H.225 and ITU-T H.323 Recommendations. (ITU-T H.225 recommendation specifies multiplexing for services on local area networks (LANs) without guaranteed quality of service (QoS); ITU-T H.323 recommendation specifies visual telephone systems and equipment for local area networks (LANs) without guaranteed quality of service (QoS).)

This can be done, since some kind of frame and control protocol is required anyway for the Iu interface Iu-I/F. Hence, the RTP protocol can be used for this purpose. In consequence, the access network AN and/or an access network unit RAN_1, RAN_2 can be regarded as representing a so-called H.323 terminal to the core network CN. Furthermore, the H.323 protocol provides an inherent capability to handle discontinuous transmission. Hence, transmission resources that are utilized in the interface Iu-I/F can be used economically.

Furthermore, also data transmitted on the interface E-I/F between respective access network control devices MSC are, according to the present invention, transmitted using the RTP format.

FIG. 1 illustrates a case in which the RTP connections are terminated in the radio access network units RAN_1, RAN_2, respectively, so that the data transmission using the RTP protocol is not used up to the terminal devices MS. Nevertheless, RTP as a transmission method could be easily adapted to be used for mobile stations as the terminal devices MS, too. Then, a terminal MS would represent a H.323 terminal with a circuit switched bearer, and RTP transmission would also be used for transmission over the air interface Um-I/F.

Also, not only the RTP protocol could be used, but also the RTCP (Real-time Transmission Control Protocol) could be used.

Now, the network's NW architecture and the adopted transmission methods on the respectively existing interfaces have been described so far. Thus, the different types of possible calls or data transmissions which may occur are described, together with the advantages resulting from the transmission method of the present invention being implemented.

Firstly, a call from a terminal MS to another terminal MS is considered (MS-MS-call). In such a case, all calls, requiring real-time processing, are handled within the network NW and are transmitted via the respective interface (Iu-I/F, E-I/F) in coded format using the RTP protocol implemented for these interfaces. Thus, no transcoding is required.

Secondly, a call to/from a terminal device MS to a terminal (not shown in FIG. 1) associated to another network is considered (non-MS-MS-call). In such a case, the respective call is routed from/to the terminal MS via the network NW through at least the access network control device MSC which is provided with the gateway GW/transcoding TC function to/from the external network such as the illustrated ISDN_PSTN network or IP network IP_NW. Thus, the transcoder functionality can be combined with the gateway function.

Furthermore, if in this case a call is established to/from a terminal device MS from/to the IP network, there is in addition no need to implement the RTP protocol in the gateway, i.e. to perform a protocol adaptation at the interface to the IP network IP_NW, since the call originating/terminating from/to the telecommunication network NW of the so-called third generation is already present in the RTP format. In conjunction with the above second assumption, this means that the gateway functionality between an IP based network IP_NW and the telecommunication network NW could be negligible and be regarded as being almost zero for this type of calls.

Thus, as described herein before, according to the present invention the RTP protocol can be effectively used for circuit switched services in the Iu interface as well as in the E-interface within a third generation telecommunication network. Also, a transcoding functionality and a gateway functionality can be implemented in an integrated manner at an access network control device such as an gateway MSC. The main advantages resulting from the transmission method as proposed by the present invention reside in that tandem free operations (TFO operations) can be easily established, with the transcoder device or transcoding functionality being located in the core network CN.

Also, due to the present invention, the interoperability of telecommunication networks NW particularly with Internet Protocol based IP networks IP_NW is significantly enhanced.

The present invention proposes a transmission method for transmitting data in a telecommunication network NW, said telecommunication network comprising at least one access network RAN adapted to transmit data to/from at least one terminal device MS and a core network CN, MSC, GW/TC, which are connected to each other via a first interface Iu, wherein said data are exchanged via said first interface Iu using a real-time transfer protocol RTP. Preferably, said real-time transfer protocol complies with ITU-T H.225 and ITU-T H.323 Recommendations. Consequently, transmission resources available on said first interface can be effectively and economically used, since the RTP protocol conforming to ITU-T H.323 Recommendation is adapted to handle discontinuous transmission. Moreover, interoperability of the radio telecommunication network with an Internet protocol based network can be improved, since the gateway functionality can significantly be reduced due to data being transmitted between the telecommunication network and the Internet protocol based network being in the same data format, so that hardly any transcoding is required. The invention also proposes a corresponding telecommunication network.

It should be understood that the above description and accompanying FIGURES are merely intended to illustrate the present invention by way of example only. The preferred embodiments of the present invention may thus vary within the scope of the attached claims.

The invention claimed is:

1. A method, comprising:
transmitting, by at least one radio access network comprised in a universal mobile telecommunication system third generation radio telecommunication network, data to at least one terminal device over an air interface; and
transmitting, using a real-time transfer protocol without transcoding the data, by the at least one radio access network, the data to a core network of the universal mobile telecommunication system third generation radio telecommunication network via a first interface connecting the at least one radio access network and the core network, the data comprising data of circuit switched services, the core network comprising a mobile switching center,
wherein the data of circuit switched services, while being processed using the real-time transfer protocol, bypasses transcoding at an interface between the core network and a network comprising at least one of an internet protocol-based network and a public switched telephone network.

2. The method according to claim 1, wherein the real-time transfer protocol complies with international telecommunication union-telecommunication H.225 and international telecommunication union-telecommunication H.323 recommendations.

3. The method according to claim 1, wherein said data comprises speech data.

4. The method according to claim 1, wherein said data comprises audio and video data.

5. The method according to claim 1, wherein the core network, used by the access network, comprises at least two access network control devices interconnected via a second interface, the method further comprising:
exchanging data via the second interface using the real-time transfer protocol.

6. The method according to claim 1, wherein the core network, used by the access network, comprises at least one access network control device, the method further comprising:
providing, by the at least one access network control device, a gateway interworking function, to thereby provide at least a third interface to at least one other network.

7. The method according to claim 6, wherein said at least one other network is operated based on an internet protocol, the method further comprising:
exchanging data via said third interface using said real-time transfer protocol.

8. The method according to claim 1, wherein said telecommunication network is a radio telecommunication network.

9. The method according to claim 1, the method comprising:
transmitting data between said at least one access network and said at least one terminal device via a fourth interface using said real-time transfer protocol.

10. A network, comprising:
a transmitter of at least one radio access network comprised in a universal mobile telecommunication system third generation radio telecommunication network, the transmitter configured to transmit data to at least one terminal device via an air interface; and
a second transmitter of the at least one radio access network, the second transmitter configured to transmit the data to a core network of the universal mobile telecommunication system third generation radio telecommunication network, via a first interface connecting the at least one radio access network and the core network, the data comprising data of circuit switched services, the transmission of the data using a real-time transfer protocol without transcoding the data, the core network comprising a mobile switching center,
wherein the data of circuit switched services, while being processed using the real-time transfer protocol, bypasses transcoding at an interface between the core network and a network comprising at least one of an internet protocol-based network and a public switched telephone network.

11. An apparatus, comprising:
a transmitter of at least one radio access network comprised in a universal mobile telecommunication system third generation radio telecommunication network, the transmitter configured to transmit data to at least one terminal device over an air interface; and
a second transmitter of the at least one radio access network, the second transmitter configured to transmit the data to a core network of the universal mobile telecommunication system third generation radio telecommunication network via a first interface connecting the at least one radio access network and the core network, the data comprising data of circuit switched services, the transmission of the data using a real-time transfer protocol without transcoding the data, the core network comprising a mobile switching center,
wherein the data of circuit switched services, while being processed using the real-time transfer protocol, bypasses transcoding at an interface between the core network and a network comprising at least one of an internet protocol-based network and a public switched telephone network.

12. The apparatus according to claim 11, wherein said real-time transfer protocol complies with international telecommunication union-telecommunication H.225 and international telecommunication union-telecommunication H.323 recommendations.

13. The apparatus according to claim 11, wherein said data comprises speech data.

14. The apparatus according to claim 11, wherein said data comprises audio and video data.

15. The apparatus according to claim 11, wherein the core network, used by the access network, comprises at least two access network control devices interconnected via the second interface, the apparatus further comprising:
an exchanger configured to exchange data via said second interface using said real-time transfer protocol.

16. The apparatus according to claim 11, wherein the core network, used by the access network, comprises at least one access network control device, the apparatus further comprising:
a provider configured to provide, by the at least one access network control device, a gateway interworking function, to thereby provide at least a third interface to at least one other network.

17. The apparatus according to claim 16, wherein said at least one other network is operated based on an internet protocol, the apparatus further comprising:
an exchanger configured to exchange data via said third interface using said real time transfer protocol.

18. The apparatus according to claim 16, wherein said at least one other network is operated according to an integrated services digital network protocol, the apparatus further comprising:
an exchanger configured to exchange data on said third interface in a pulse code modulated data format, and said access network control device configured to provide said gateway interworking function is additionally configured to perform a transcoding between data present in a pulse code modulated data format and the data present in the real-time transfer protocol format.

19. The apparatus according to claim 11, wherein said telecommunication network is a radio telecommunication network.

20. The apparatus according to claim 11, the apparatus comprising:
a transmitter configured to transmit data between said at least one access network and said at least one terminal device via a fourth interface using said real-time transfer protocol.

21. A non-transitory computer-readable storage medium encoded with instructions that, when executed on a computer, performs a process, the process comprising:
transmitting, by at least one radio access network comprised in a universal mobile telecommunication system third generation radio telecommunication network, data to at least one terminal device over an air interface; and
transmitting by the at least one radio access network, the data to a core network of the universal mobile telecommunication system third generation radio telecommunication network via a first interface connecting the at least one radio access network and the core network, the data comprising data of circuit switched services, the transmission of the data using a real-time transfer protocol without transcoding the data, the core network comprising a mobile switching center,
wherein the data of circuit switched services, while being processed using the real-time transfer protocol, bypasses transcoding at an interface between the core network and a network comprising at least one of an internet protocol-based network and a public switched telephone network.

* * * * *